(12) United States Patent
Wu

(10) Patent No.: US 7,189,037 B2
(45) Date of Patent: Mar. 13, 2007

(54) VERSATILE ADJUSTABLE STYLUS FOR KEY DUPLICATING MACHINE

(76) Inventor: Kuo-Shen Wu, No. 10, Alley 14, Lane 74, Pa Ta Road, Section 3, Taipei (TW)

( * ) Notice: Subject to any disclaimer, the term of this patent is extended or adjusted under 35 U.S.C. 154(b) by 9 days.

(21) Appl. No.: 10/976,401

(22) Filed: Oct. 29, 2004

(65) Prior Publication Data

US 2006/0093450 A1    May 4, 2006

(51) Int. Cl.
*B23C 3/35* (2006.01)

(52) U.S. Cl. ............................ 409/81; 409/126; 76/110

(58) Field of Classification Search ............ 409/81–83, 409/125–126, 130; 76/110; *B23C 3/35*
See application file for complete search history.

(56) References Cited

U.S. PATENT DOCUMENTS

| | | | | |
|---|---|---|---|---|
| 1,634,133 | A * | 6/1927 | Beisser | 409/81 |
| 3,722,341 | A * | 3/1973 | Hungerford et al. | 83/413 |
| 3,902,382 | A * | 9/1975 | Lieptz | 76/110 |
| 4,614,465 | A * | 9/1986 | Wu | 409/81 |
| 4,898,504 | A * | 2/1990 | Agius et al. | 409/81 |
| 5,259,708 | A * | 11/1993 | Brice | 409/81 |
| 5,496,138 | A * | 3/1996 | Drori | 409/81 |
| 5,607,267 | A * | 3/1997 | Heredia et al. | 409/81 |
| 5,660,509 | A * | 8/1997 | Cole et al. | 409/81 |
| 5,951,218 | A * | 9/1999 | Wu | 409/81 |
| 6,033,164 | A * | 3/2000 | Hoffman et al. | 409/81 |

FOREIGN PATENT DOCUMENTS

GB           2040759 A    *   9/1980

\* cited by examiner

*Primary Examiner*—Monica Carter
*Assistant Examiner*—Eric A. Gates
(74) *Attorney, Agent, or Firm*—Ladas & Parry LLP

(57) ABSTRACT

A versatile adjustable stylus for key duplicating machine comprising an arm laterally secured at one end on the periphery of a cylindrical body, and laterally movably arranged at the other end on an engagement base secured on a substrate of the key duplicating machine in accordance with the different duplicating distances between the duplicating cutter and the original keys to be duplicated; a retractable spring-loaded tracer movably engaged in one end of the cylindrical body, for pre-tracing the depths of the key teeth of an original key; and a regulating grip angularly movably engaged in the other end of the cylindrical body, for regulating the retractable movement amount of the retractable spring-loaded tracer.

7 Claims, 2 Drawing Sheets

VERSATILE ADJUSTABLE STYLUS FOR KEY DUPLICATING MACHINE

BACKGROUND OF THE INVENTION

The present invention relates to a versatile adjustable stylus for key duplicating machine, for adapting various duplicating distances between the duplicating cutter and the original keys to be duplicated, and for use both in duplication of the substantial small and simpler keys and in duplication of the substantial large and complicated keys.

There are two kinds of styluses in the conventional stylus for key duplicating machine: a semi-cylindrical stylus having a hypotenuse end; and a sheet stylus. Whether a semi-cylindrical stylus or a sheet stylus, they all fall within a stationary structure, and the stylus can not be movable or retractable. Further, the stylus is in alignment with the edge of the cutter, and hence it can not pre-trace the pattern of the teeth of the original key to be duplicated, especially the depth of the square thread -like pattern of the teeth of the original key. Furthermore, the duplicating distance between the duplicating cutter and the original key to be duplicated is constant, and can not be varied, and hence it can only be used in the substantial small and simpler key, and can not be used in the substantial large and complicated key, e.g. a key for safe, and a five-stage sheet key, which can only be duplicated in accordance with a special designed and complicated jig.

The present invention aims at eliminating the above disadvantages and provides a versatile adjustable stylus for key duplicating machine, for adapting various duplicating distances between the duplicating cutter and the original keys to be duplicated, for use both in duplication of the substantial small and simpler keys and in duplication of the substantial large and complicated keys.

In a preferred aspect of the present invention, the versatile adjustable stylus for key duplicating machine comprises an arm laterally secured at one end on the periphery of a cylindrical body, and laterally movably arranged at the other end on an engagement base secured on a substrate of the key duplicating machine in accordance with the different duplicating distances between the duplicating cutter and the original keys to be duplicated, for use both in duplication of the substantial small and simpler keys and in duplication of the substantial large and complicated keys; a retractable spring-loaded tracer movably engaged in one end of the cylindrical body, for pre-tracing the depths of the key teeth of an original key; and a regulating grip angularly movably engaged in the other end of the cylindrical body, for regulating the retractable movement amount of the retractable spring-loaded tracer.

BRIEF DESCRIPTION OF THE DRAWING

An embodiment of the present invention will now be described by way of example with reference to the accompanying drawings in which.

DETAILED DESCRIPTION OF THE INVENTION

Figure 1:
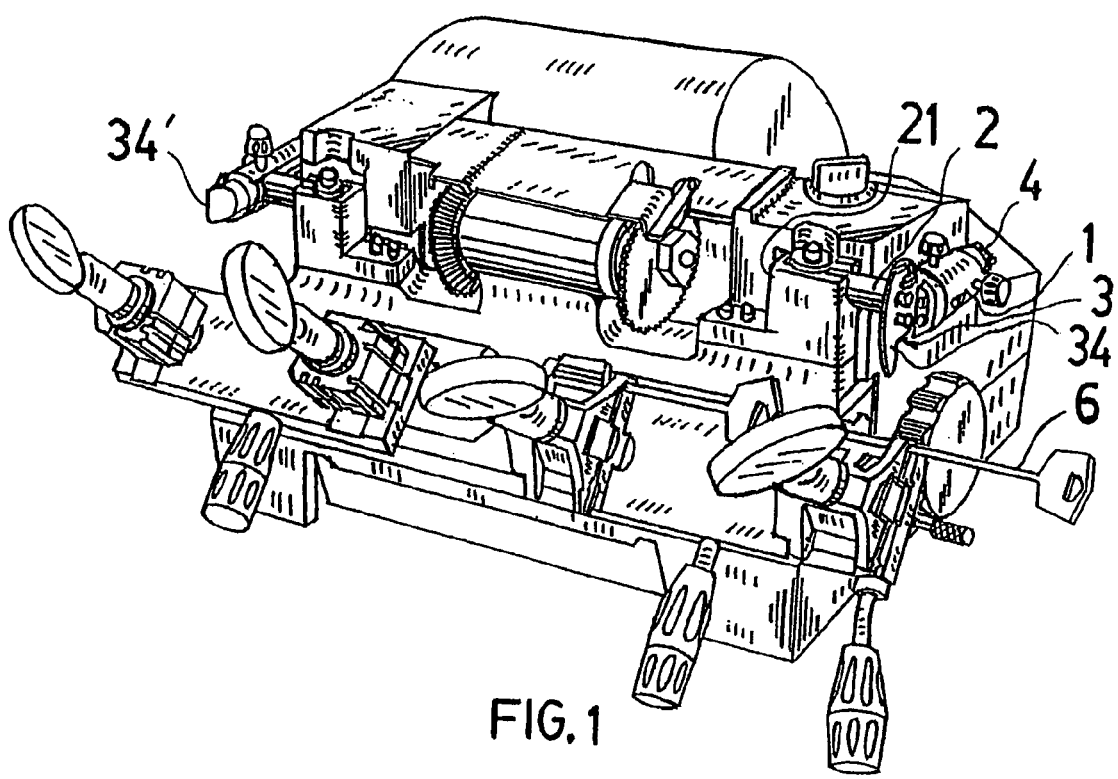
FIG. 1 is a perspective view of a duplicating machine in which a versatile adjustable stylus for key duplicating machine according to the present invention is disclosed.
Figure 2:
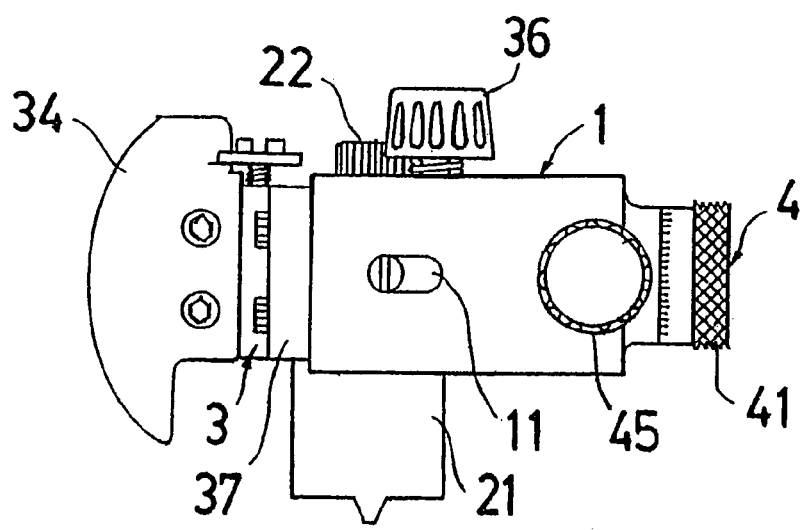
FIG. 2 is a side view of a versatile adjustable stylus for key duplicating machine according to the present invention.
Figure 3:
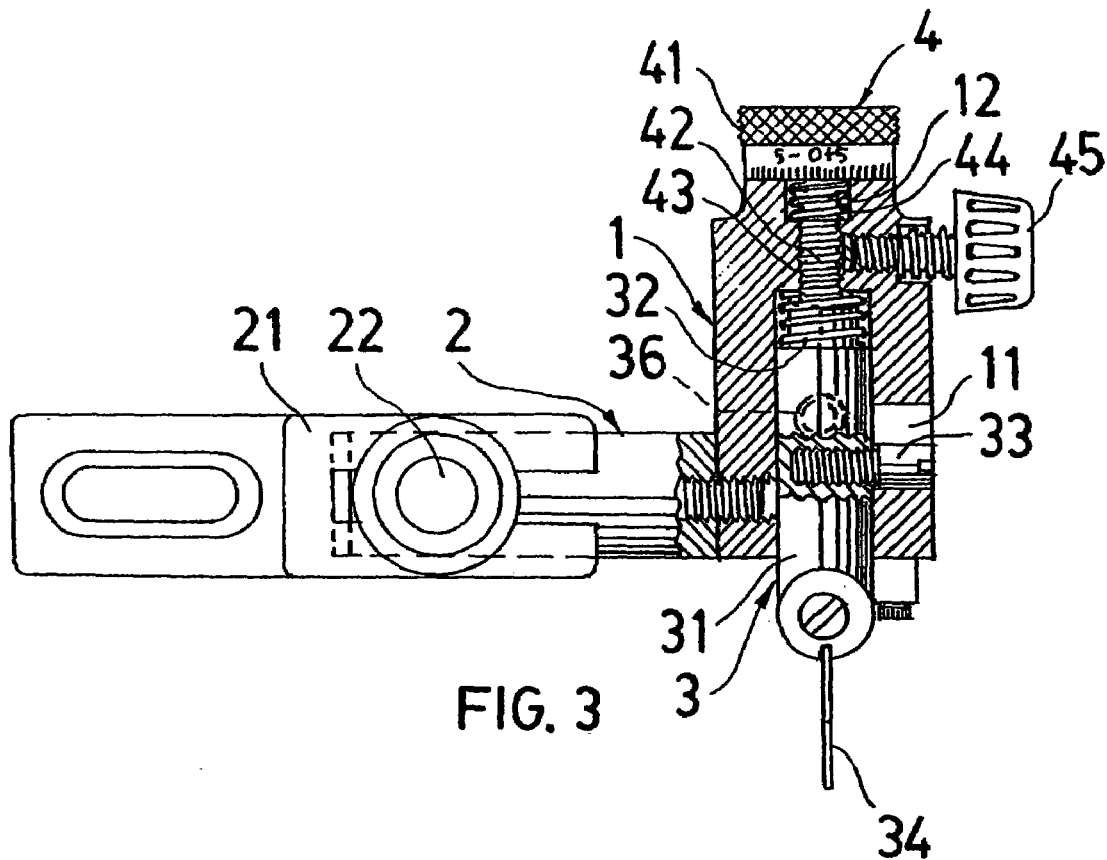
FIG. 3 is a partial sectional top view of a versatile adjustable stylus for key duplicating machine according to the present invention; an FIG. 4 is a partial sectional front view of a versatile adjustable stylus for key duplicating machine according to the present invention.
Figure 4:
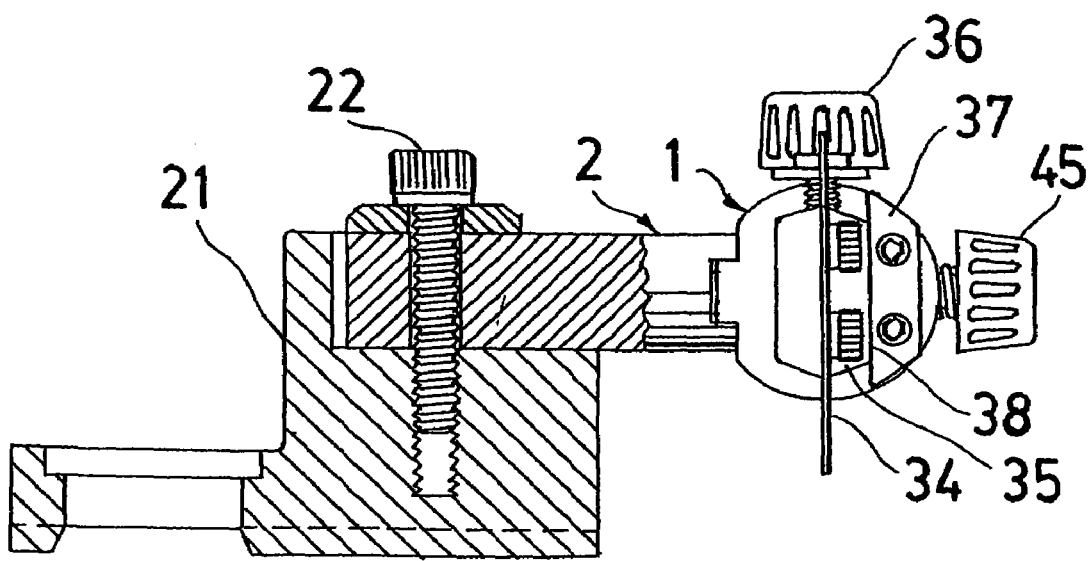

Referring to FIGS. 1~4, a versatile adjustable stylus for key duplicating machine which is an embodiment of the present invention comprises a cylindrical body 1; an arm 2 laterally secured at the proper position on the periphery of the cylindrical body, and laterally movably arranged on an engagement base 21 in accordance with the different duplicating distances between the duplicating cutter and the original keys to be duplicated; a retractable spring-loaded tracer 3 movably engaged in one end of the cylindrical body 1; and a regulating grip 4 angularly movably engaged in the other end of the cylindrical body 1. Due to the fact that the arm 2 is secured on the engagement base 21 by means of a screw 22, a duplicating distance between the duplicating cutter and the original key to be duplicated can be varied by loosening the screw 22, and laterally moving the retractable spring-loaded tracer 3.

The retractable spring-loaded tracer 3 comprises a slide spindle 31 which can be movably engaged in the front interior of the cylindrical body 1 and sustaining a front end exposed from the cylindrical body 1; a compression spring 32 engaged in the rear interior between the rear inner wall and the rear end of the slide spindle 31, for biasing the slide spindle forward; a lateral stopper 33 which is laterally secured on the intermediate portion of the slide spindle 31, and protrudes into an elongated elliptical slot 11, for preventing the whole slide spindle from being removed from the cylindrical body 1; and an arc sheet tracer 34 uprightly secured on the front flat portion 35, in order to form a retractable spring-loaded tracer. Furthermore, in the present invention, a screw 36 with spring is provided on the intermediate top wall of the cylindrical body 1, for pressing against the slide spindle 31, by turning the same, in order that the movement of the slide spindle can be stopped, and a stationary stylus can be formed, and a retractable spring-loaded tracer can be restored by loosening the screw 36. Further, a guide 37 is secured on the front end wall of the cylindrical body 1, and having an upright guide surface 38 formed, for touching and guiding the front flat portion 35 formed at the front end of the slide spindle 31, in order to sustain an upright movement of the slide spindle caused from the retractable spring force exerted from the retractable spring-loaded tracer, and to always maintain the arc sheet tracer in an upright status.

The regulating grip 4 comprises a disc 41; a screw 42 secured at the center portion of the disc, for engagement with the female thread portion 43 provided at the rear interior of the cylindrical body, and having an end portion extended over the female thread portion 43 to press against the rear end portion of the slide spindle 31, for slightly regulating the retractable movement amount of the arc sheet tracer 34 of the retractable spring-loaded tracer by slightly turning the disc 41, in order to pre-trace the depths of the key teeth of an ordinary small key, or a substantial large original key 6 clamped by the vise for original key. (as shown in FIG. 1) For preventing the screw 42 from being moved due to the vibration caused from running of the key duplicating machine; and a substantial large slot 12 is provided in the rear center portion of the cylindrical body, for receiving a compression spring 44, and passing the screw 42 to press against the disc 41. In the present invention, a screw 45 with spring is engaged in the rear end wall of the cylindrical body, for driving the same to press against the screw 42 by turning the screw 45, in order to prevent the screw 42 from being moved, and to have the retractable spring-loaded tracer being useless, and become a stationary stylus. However, by simply loosening the screw 45, a retractable spring-loaded tracer can be effectively restored.

In the present invention, the arc sheet tracer 34 can be modified into a semi-cylindrical stylus 34' (as shown in FIG. 1) without varying the constructional principle of the present invention, in order to form another retractable spring-loaded semi-cylindrical stylus.

The invention claimed is:

1. A versatile adjustable stylus for a key duplicating machine, comprising an arm laterally secured at one end on the periphery of a cylindrical body, and laterally movably attached at an other end to a substrate by an engagement base secured on the substrate of the said key duplicating machine, wherein the direction of lateral movement is generally parallel to the longitudinal axis of an original key to be duplicated and the rotational axis of a duplicating cutter, whereby the arm and the cylindrical body are arranged to move closer to or further away from the duplicating cutter in accordance with different duplicating distances between the duplicating cutter and the original key to be duplicated; a retractable spring-loaded tracer movably engaged in one end of the said cylindrical body, for pre-tracing depths of key teeth of an original key; and a regulating grip angularly movably engaged in an other end of the said cylindrical body, for regulating retractable movement amount of the said retractable spring-loaded tracer.

2. The versatile adjustable stylus for a key duplicating machine as claimed in claim 1, wherein the said retractable spring-loaded tracer comprises a slide spindle movably engaged in a front interior of the said cylindrical body; a compression spring engaged in a rear interior between a rear inner wall and a rear end of the said slide spindle, for biasing the said slide spindle forward; and an arc sheet tracer uprightly secured on a front flat portion formed at an end of the said slide spindle.

3. The versatile adjustable stylus for a key duplicating machine as claimed in claim 2, wherein a guide is secured at a front end wall of the said cylindrical body, and having an upright guide surface formed, for guiding the said front flat portion to a pre-determined position, in order to sustain an upright movement of the said slide spindle.

4. The versatile adjustable stylus for a key duplicating machine as claimed in claim 2, wherein the said regulating grip comprises a disc; and a screw provided at the center portion of the said disc, for engagement of a female thread portion formed at a rear interior of the said cylindrical body, and having an end portion extended over the said female thread portion to press against a rear end portion of the said slide spindle, for slightly regulating retractable movement amount of the said arc sheet tracer of the said retractable spring-loaded tracer by slightly turning the said disc.

5. The versatile adjustable stylus for a key duplicating machine as claimed in claim 4, wherein a substantial large slot is formed in a rear center portion of the said cylindrical body, for receiving a compression spring, and passing the said screw to press against the said disc, for preventing the said screw from being moved due to a vibration caused from running of the said key duplicating machine.

6. The versatile adjustable stylus for a key duplicating machine as claimed in claim 2, wherein a screw with a spring is provided at a proper position on a rear end wall, and an intermediate top wall of said cylindrical body respectively, for locking a screw in a disc, and the said slide spindle respectively, in order to form a stationary stylus for the said key duplicating machine.

7. The versatile adjustable stylus for a key duplicating machine as claimed in claim 2, wherein a lateral stopper is laterally provided on an intermediate portion of said slide spindle, and protrudes into an elongated elliptical slot, for preventing the whole slide spindle from being removed from the said cylindrical body.

* * * * *